United States Patent Office 3,030,161
Patented Apr. 17, 1962

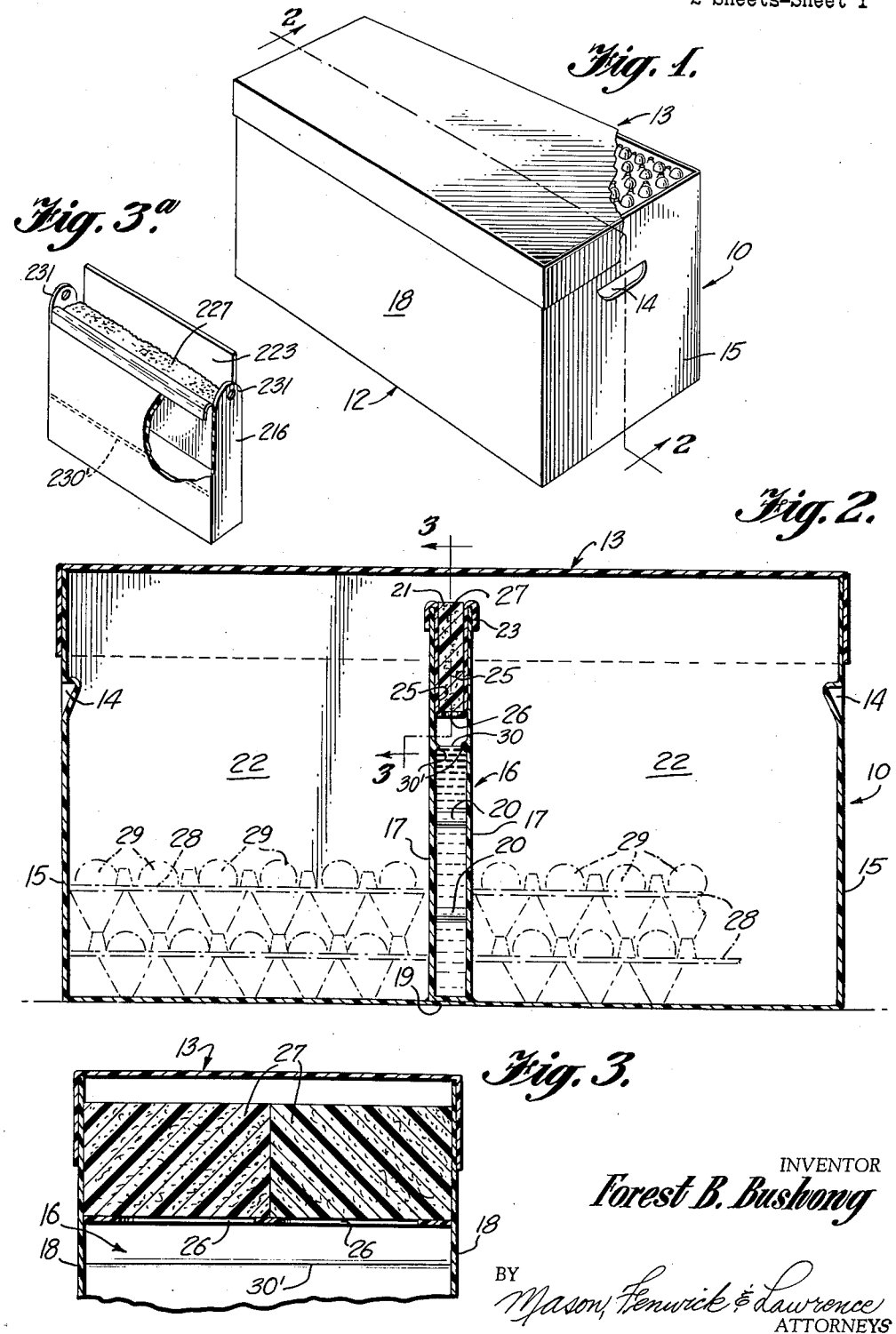
April 17, 1962     F. B. BUSHONG     3,030,161
EGG CASE
Filed Sept. 1, 1959     2 Sheets-Sheet 1
INVENTOR
Forest B. Bushong
BY Mason, Fenwick & Lawrence
ATTORNEYS April 17, 1962 F. B. BUSHONG 3,030,161
EGG CASE
Filed Sept. 1, 1959 2 Sheets-Sheet 2
Fig. 4.
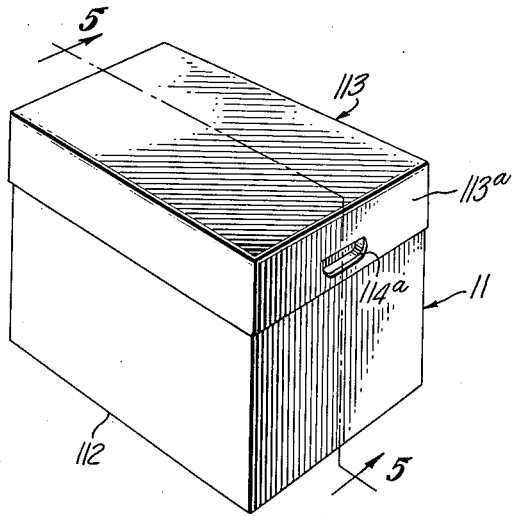
Fig. 5.
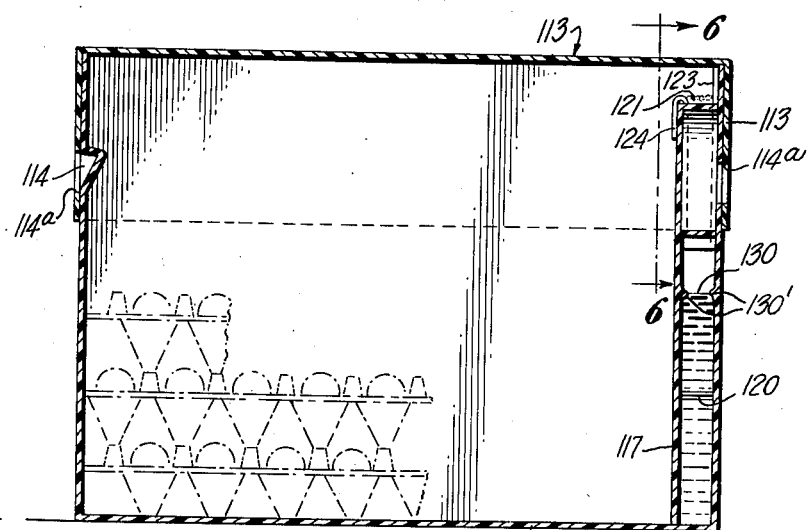
Fig. 6.
Fig. 7.
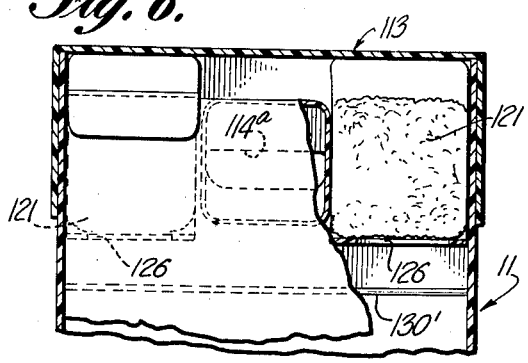
INVENTOR
*Forest B. Bushong*
BY *Mason, Fenwick & Lawrence*
ATTORNEYS

3,030,161
EGG CASE
Forest B. Bushong, Woodstock, Va.
Filed Sept. 1, 1959, Ser. No. 837,538
3 Claims. (Cl. 312—31.01)

This invention relates to transportation cases for shell eggs, and more particularly to egg cases having means for protecting the quality of the eggs packed therein.

The present invention is applicable to cases for the transportation of all types of shell eggs of commerce, such as chicken, turkey and duck eggs, for example. For the purpose of illustrating the invention, however, it will be described with respect to cases for the transportation of chicken eggs.

It is well known in egg marketing that an egg deteriorates from the time it is laid. However, it is also known that the deterioration process can be retarded by care and handling of the egg.

An egg is a living organism encompassed in a shell. The shell is not impervious, but consists of a spongy calciferous layer having an outer cuticle membrane of tough fibrous protein material and a thin inner membrane of similar material as the cuticle. The entire area of the shell is interspersed with transverse pore canals, through which vapor moisture, air and gases or odors may move in either direction. When an egg is first laid, the shell is completely filled, but after it has cooled the contents shrink and an air cell is formed at the large end of the egg.

The size and movement of the air cell is used as one of the factors by which the quality of the egg is judged during the candling of the egg. The depth of the air cell should not exceed ⅛ inch for an AA grade egg, ¼ inch for an A grade egg and ⅜ inch for a B grade egg, and a C grade egg may have a greater depth of air cell.

The distinctness of the yolk shadow outline is another factor by which eggs are graded. Also, the movement of the yolk when the egg is twirled before the candling light is another factor. There are still other factors used in grading eggs, but the present invention is concerned primarily with the two which have been set out above.

The producer should provide himself with a cool, humid storage room for storing eggs, and the eggs should be marketed two to three times a week in clean containers protected from transportation shock, wind, and extremes of temperature. By keeping temperature and humidity at optimum levels, the loss in quality of eggs to a large extent may be retarded.

The present practice of marketing eggs in cardboard or wooden cases contributes to the loss in quality of eggs during transportation from the producer to the receiving station of the marketing firm. Eggs which would have graded AA or A are frequently graded B or C, due to excessive loss of moisture. This may result in a loss to the producer of twenty cents per dozen or more. Farmers who transport their eggs to market seldom have a refrigerated truck for use in summer. Cardboard and wooden cases absorb moisture from the eggs, and the large air cells of these eggs result in down grading. Also, the excessive heat in the truck in summer causes a change in color and size of the yolk, which will also result in down grading.

Consequently, it is an object of the present invention to provide an egg case which has a humidifying unit to maintain humidity in the case.

It is a further object of the present invention to provide such an egg case which retards the flow of heat through the container walls; which is impervious to moisture; and is easy to clean.

Other objects and advantages of the present invention will become apparent to those skilled in the art, from the following description when read in conjunction with the accompanying drawing, wherein:

FIGURE 1 is a perspective view of an egg case having a humidifying unit providing a center divider for the case, in accordance with the present invention;

FIGURE 2 is a vertical sectional view taken on the line 2—2 of FIGURE 1;

FIGURE 3 is a vertical sectional view taken on the line 3—3 of FIGURE 2;

FIGURE 3a is a perspective view of the humidifying unit of the present invention for installation in known types of egg cases;

FIGURE 4 is a perspective view of an egg case of the present invention having the humidifying unit of the present invention;

FIGURE 5 is a vertical longitudinal sectional view taken on the line 5—5 of FIGURE 4;

FIGURE 6 is a fragmentary vertical transverse sectional view of the humidifying unit in one end of the egg case, taken on the line 6—6 of FIGURE 5;

FIGURE 7 is a perspective view of the holder for the diffuser-stopper of the humidifying unit.

Adverting now to the drawing, and particularly to FIGURES 1 and 4, there are shown egg cases 10 and 11 made in accordance with the present invention. The egg cases 10 and 11 are made of polyethylene, a thermoplastic polymer of ethylene. The egg case 10 corresponds in size to the well known cardboard or wooden 30-dozen egg case, and the egg case 11 corresponds in size to the well-known 24-dozen egg case.

The egg case 10 comprises a box portion 12 and a snug fitting lid 13. The box portion 12 has the hand grips 14 in each of the end walls 15, and the hand grips 14 are a recessed or offset portion of the walls 15, so that there will be no opening in the wall through which humidity may be lost. The box portion 12 is also provided with a central, transversely disposed humidifying unit 16 which forms a divider that divides the box portion 12 into two compartments of equal size, each compartment holding fifteen dozen eggs. The humidifying unit 16 has the transversely spaced apart walls 17 which are also made of polyethylene plastic and are integrally attached to the side walls 18 and bottom 19 of the box portion 12. The box portion 12 is most economically molded as a unit, including the humidifier compartment 16. After molding, the compartment 16 may be reinforced by adhesively mounting the reinforcing spacers 20.

A diffuser-stopper 21 is a closure for the humidifier compartment 16, the purpose of which is to prevent the sloshing of water with which the compartment 16 is partially filled, onto the eggs, and to provide for the diffusion of water vapor from the compartment 16 into the egg compartments 22 of the box portion 12. The diffuser-stopper 21 comprises a holder 23 of substantially U-shape, made of polyethylene plastic, non-corrodable metal or like material, having reversely bent flanges 24 to snugly embrace the upper edges of the walls 17. The legs 25 of the holder 23 may be imperforate, but the bottom 26 is made perforate to permit the passage of water vapor, and as seen in FIGURES 2 and 3, the bottom 26 is slotted. A sponge 27 is snugly mounted in the holder 23 to fully extend across length and breadth of the open end of the compartment 16, as seen in FIGURE 3. The sponge 27 may be a natural spongy material or it may be a synthetic sponge such as for example, cellulose sponge, which will transfer water vapor therethrough.

The fillers 28 which support the eggs 29 in spaced apart relation are also made of synthetic resin plastic or other water impervious material.

In use, the diffuser-stopper 21 is removed from the humidifier compartment 16 and the compartment is filled with water to a level 30. The diffuser-stopper 21 is replaced in the top of the compartment 16. The water level 30 is below the bottom of the diffuser-stopper 21. Eggs are then packed in the plastic fillers 28 to fill the compartments 22, and the lid 13 is put on to close the box portion 12. A rib 30' is adhesively attached to the wall 17 to gauge the water level.

The egg case 10 provides a humid atmosphere which eliminates loss of moisture from the eggs. The humid atmosphere of the case 10 is entirely independent of humidity conditions in the room or truck in which the eggs are stored. The walls of the egg case 10 when made of polyethylene plastic having a thickness of substantially 1/8 inch or more, is superior to cardboard to insulate the eggs against extremes of temperature. In a comparative test conducted on a well-known cardboard egg case and an egg case made in accordance with the present invention, the two cases filled with eggs were placed in a room at 40° F. and remained there until the interior temperature of both cases reached 40° F. Both cases were then removed to a truck in which the temperature was 81° F. After forty-five minutes, the interior temperature of the cardboard case had reached 81° F. In one hour, the egg case of the present invention reached 70° F. and it required more than two hours before it reached 81° F.

As stated, the egg case 11 corresponds in size to the 24-dozen egg case, but like the egg case 10 it is also made of polyethylene plastic. The egg case 11 comprises the body portion 112 and lid 113. The body portion 112 is provided with pocket-like hand grips 114, and the lid 113 is provided with apertures 114a which register with the hand grips 114, since the lid 113 is provided with a longer skirt portion 113a than the egg case 10. A humidifier unit 116 is integrally mounted in one end 115 of the egg case 11 and may be molded integral with the body portion 112. The humidifier unit 116 is provided with a bifurcated throat 130 which lies on either side of the grip 114. A diffuser-stopper 121 is mounted in each branch of the throat 130. The diffuser-stopper 121 is provided with a holder 123, which is substantially U-shaped in cross-section, and has one of its legs reversely bent to provide the flange 124 which snugly embraces the top edge of the wall 117. A sponge 127 is mounted in each of the holders 123 and these are inserted in each of the branch openings 130 of the compartment 116. The sponges 127 are similar to the sponge 27, and performs the function of preventing the water from sloshing from the compartment 116, and also diffuses water vapor from the compartment 116 into the interior of the egg case 11 when the lid 113 is in closed position.

In FIGURE 3a there is shown a humidifier unit 216 comprising a water storage container 217, made of polyethylene plastic, non-corrodable metal or like material, having a diffuser-stopper holder 223 slidably mounted in the opening of said container. A diffuser-stopper 227 made of material similar to the diffuser-stopper 27 is mounted in the holder 223. Slots 225 in the bottom of the holder 223 provide a passageway for the water vapor. A rib 230' attached to the wall of the container 217 indicates the level to which the container is to be filled. The humidifier unit 216 is self contained and may be attached within the interior of egg cases made of cardboard or wood to increase the humidity within such cases. The upstanding apertured ears 231 are provided as a means of attaching the unit to a case.

Egg cases made of polyethylene plastic are easy to be cleaned; do not acquire a musty odor; and due to their long life as compared with cardboard and wooden cases, are very economical.

Use of egg cases made in acordance with the present invention will materially aid in reducing down grading of eggs due to enlargement of the air cell from loss of moisture, darkening and enlargement of the yolk from exposure to high temperature during transportation, and musty odor acquired by the eggs from re-use of cardboard cases which have become musty resulting from absorption of moisture from eggs previously packed in them.

While there has been disclosed in the foregoing description a practical embodiment of the egg case in accordance with the present invention, it will be understood by those skilled in the art that variations in the implementation of the concept of the invention are within the purview and scope of the invention.

What is claimed is:

1. An egg case comprising, a moisture-proof box portion made of polyethylene plastic and having an egg receiving space therein, a moisture-proof snug-fitting lid made of polyethylene plastic to substantially seal said box portion against seepage of water vapor therefrom, a water storage compartment fixedly mounted in said box portion and having an open top in sole communication with said egg receiving space, said compartment extending substantially entirely across said box portion, a rim around said open top, a diffuser-stopper made of spongy water-absorbing material extending substantially across said box portion, means for mounting said diffuser-stopper in said open top, said mounting means extending into said water storage compartment and terminating above the water level of said compartment, and said diffuser-stopper being a water vapor permeable closure for said open top.

2. An egg case comprising, a moisture-proof box portion made of polyethylene plastic and having an egg receiving space therein, a moisture-proof snug-fitting lid made of polyethylene plastic to substantially seal said box portion against seepage of water vapor therefrom, a water storage compartment fixedly mounted in said box portion and having an open top in sole communication with said egg receiving space, said compartment extending substantially entirely across said box portion, a diffuser-stopper made of cellulose sponge, a holder extending into said water storage compartment for mounting said diffuser-stopper in said open top, said holder having a reversely bent flange to engage said rim of said open top and limit the extension of said holder into said compartment, and said diffuser-stopper being a water vapor permeable closure for said open top.

3. An egg case comprising, a moisture-proof box portion made of polyethylene plastic and having an egg receiving space therein, a moisture-proof snug fitting lid made of polyethylene plastc to substantially seal said box portion against seepage of water vapor therefrom, a water storage compartment fixedly mounted in said box portion and having an open top in sole communication with said egg receiving space, said compartment extending substantially entirely across said box portion, a rim around said open top, a diffuser-stopper made of spongy water-absorbing material extending substantially across said box portion, and means for mounting said diffuser-stopper in said open top, said diffuser-stopper being a water vapor permeable closure for said open top.

References Cited in the file of this patent

UNITED STATES PATENTS

| | | |
|---|---|---|
| 366,435 | Swift | July 12, 1887 |
| 512,219 | Rich | Jan. 2, 1894 |
| 893,740 | Leeper | July 21, 1908 |
| 1,504,062 | Ladd | Aug. 5, 1924 |
| 1,998,543 | Humphrey | Apr. 23, 1935 |
| 2,414,171 | Scharff | Jan. 14, 1947 |
| 2,547,716 | Murphy | Apr. 3, 1951 |
| 2,554,302 | Keskitald | May 22, 1951 |
| 2,671,707 | Lombard | Mar. 9, 1954 |
| 2,780,259 | Nalle | Feb. 5, 1957 |

FOREIGN PATENTS

| | | |
|---|---|---|
| 102,103 | Great Britain | Nov. 16, 1916 |